United States Patent [19]
Osborn

[11] Patent Number: 5,442,975
[45] Date of Patent: Aug. 22, 1995

[54] BEARING ARRANGEMENT FOR SHIFT LEVER

[75] Inventor: Charles Osborn, Spring Lake, Mich.

[73] Assignee: Grand Haven Stamped Products Co., Div. of JSJ Corp., Grand Haven, Mich.

[21] Appl. No.: 169,316

[22] Filed: Dec. 17, 1993

[51] Int. Cl.$^6$ .................................. B60K 20/04
[52] U.S. Cl. ................... 74/473 R; 74/538; 74/475; 403/289; 403/79
[58] Field of Search ............ 74/538, 475, 473 R; 403/289, 79, 330, 158, 153, 150, 161, 162

[56] References Cited

U.S. PATENT DOCUMENTS

| | | | |
|---|---|---|---|
| 2,625,415 | 1/1953 | Smith | 403/289 |
| 2,862,747 | 12/1958 | Deliso | 403/289 |
| 3,865,437 | 2/1975 | Crosby | 403/289 |
| 3,994,184 | 11/1976 | Osborn | 74/473 R |
| 4,343,202 | 8/1982 | Osborn | 74/538 |
| 4,370,897 | 2/1983 | Carlo | 74/475 |
| 4,457,188 | 7/1984 | Hauser | 74/473 R |
| 4,875,383 | 10/1989 | Holman et al. | 74/473 R |
| 4,977,789 | 12/1990 | Osborn | 74/475 |
| 5,044,220 | 9/1991 | Raff et al. | 74/473 R |
| 5,207,124 | 5/1993 | Anderson et al. | 74/538 |
| 5,220,984 | 6/1993 | Ruiter | 74/475 |
| 5,263,383 | 11/1993 | Meisch et al. | 74/475 |

Primary Examiner—Rodney H. Bonck
Assistant Examiner—David Fenstermacher
Attorney, Agent, or Firm—Price, Heneveld, Cooper, DeWitt & Litton

[57] ABSTRACT

A shifter for a vehicle transmission includes a base having a pair of parallel flanges, and a shift stick having a structure adapted to fit between the flanges. The flanges and the structure include apertures that can be co-axially aligned such that pivot pins can be extended through the flanges into the structure to thus form a low friction bearing. Specifically, the pivot pins include a shaft section with an end adapted to snap-lock into the structure and further include a non-uniform surface with ribs that non-rotatably frictionally engage the structure when extended into the apertures in the structure. The pivot pins further include a head adapted to rotatably engage the apertures in the flanges, the head and the flange apertures forming a low friction bearing arrangement for supporting the shift stick on the shifter base. The pivot pins are preferably made from a lubricous polymeric material such as acetal.

25 Claims, 3 Drawing Sheets

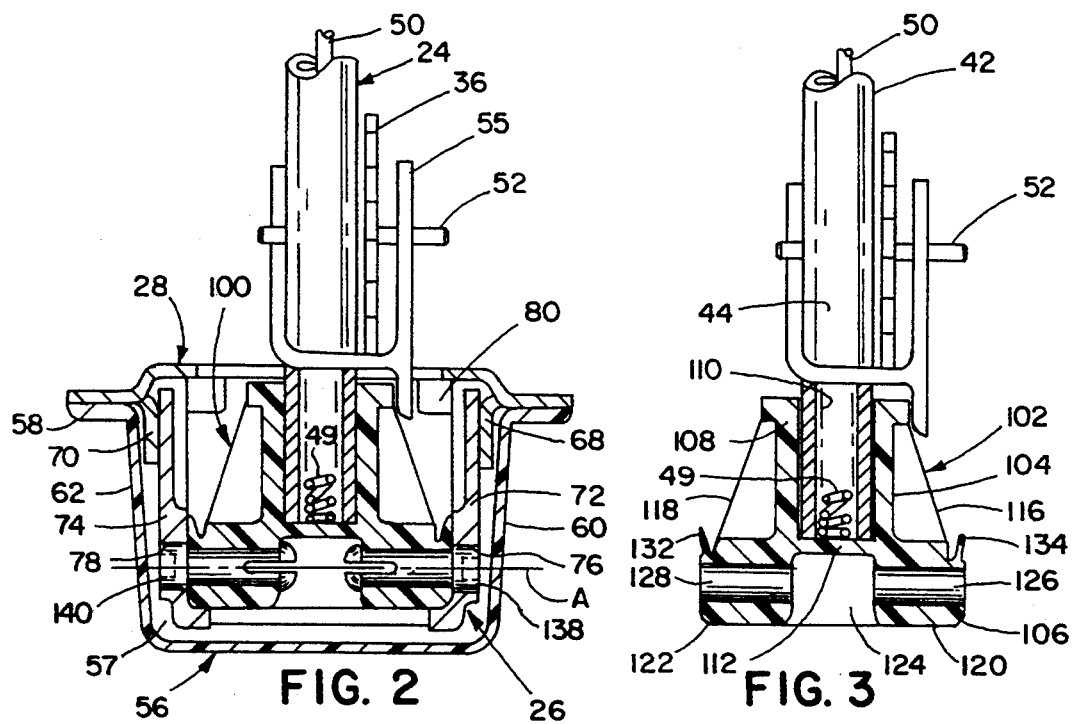

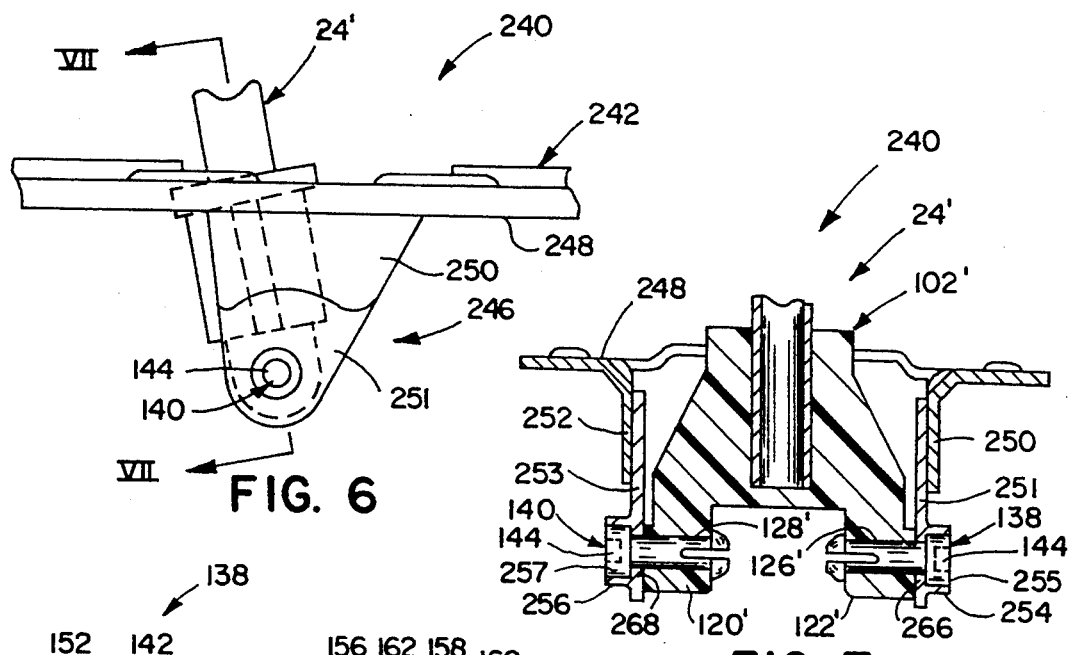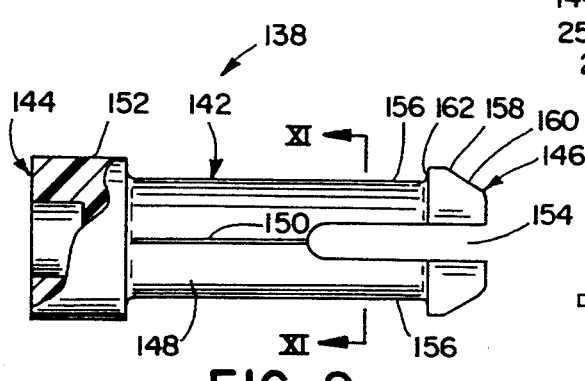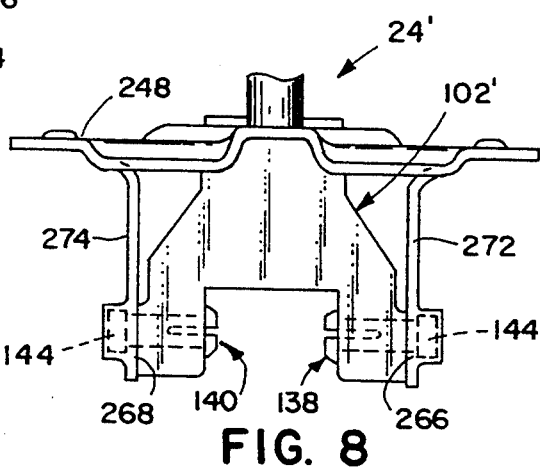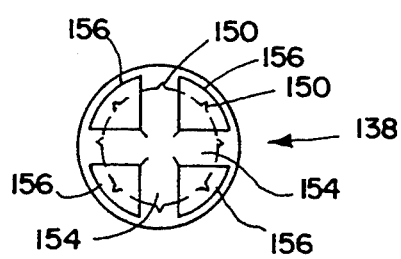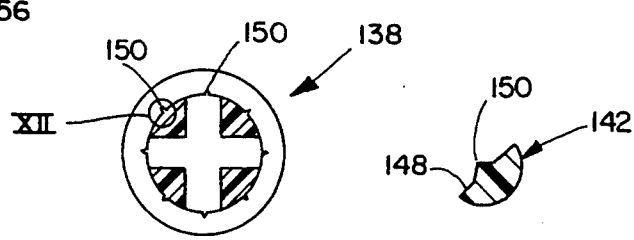

BEARING ARRANGEMENT FOR SHIFT LEVER

BACKGROUND OF THE INVENTION

The present invention concerns automotive transmission shifters, and in particular concerns a bearing arrangement for pivotally mounting a shift lever to a base.

A number of different bearing arrangements for pivotally mounting a shift lever to a shifter base have been developed. However, known bearing arrangements typically include pieces which are inherently difficult to manufacture and assemble in a reliable and consistent manner. For example, some bearing arrangements use a pivot pin for pivotally mounting the shift lever to the base. The pivot pin is first extended through the shift lever and the base, and then clinched at one end to hold the pivot pin in place. However, clinching is a difficult process requiring special equipment and fixtures to reliably repeatably perform. Further, not all pivot pins deform in the same manner or to the same degree making it an even more difficult process. Still further, care must be taken to assure that an adequate amount of lubricant remains on the pivot pin after assembly and to assure that the pivot pin does not otherwise unacceptably bind. Another alternative to clinching is to use a spring clip that snaps onto an end of the pivot pin. However use of a spring clip is not entirely satisfactory since it requires a separate part, is relatively expensive, and further requires a tedious subassembly operation.

Thus, improvements are desired which facilitate assembly while also minimizing part cost and maximizing reliability and consistency of assembly.

SUMMARY OF THE INVENTION

The present invention includes a shifter for an automotive transmission that provides the aforementioned improvements. The shifter includes an elongated pivotable shift stick, and a base adapted for mounting the shifter to a vehicle. A structure is attached to the lower end of the shift stick, and a pair of bearing forming supports are located on the base and spaced apart for receiving the structure therebetween. Shaft means is non-rotatingly secured to the structure with a section protruding from the structure for pivotally engaging the bearing forming supports, the protruding section and the bearing forming structure including bearing surfaces defining an axis of rotation about which the shift stick pivots which are configured to slideably engage and form a low friction bearing arrangement. In the preferred form, the protruding members include a pair of pivot pins having one end configured to snaplock into holes in the structure in a manner that facilitates assembly, and having an opposite end with an enlarged head for slideably engaging a hole in the bearing support, the bearing support capturing the bearing structure therebetween to provide a stable assembly.

These and other features, advantages and objects of the present invention will be further understood and appreciated by those skilled in the art by reference to the following specification, claims and appended drawings.

BRIEF DESCRIPTION OF THE DRAWINGS

FIG. 2 is a cross section taken along the plane II—II in FIG. 1;

FIG. 3 is a cross-sectional view of the lower end of the shift lever of FIG. 2 but with the shifter base having been removed for clarity;

FIG. 4 is a fragmentary side view of a second shifter embodying the present invention;

FIG. 5 is a cross section taken along the plane V—V in FIG. 4;

FIG. 6 is a side view of a third shifter embodying the present invention;

FIG. 7 is a cross section taken along the lines VII—VII in FIG. 6;

FIG. 8 is an end view of a shifter embodying the present invention comparable to the shifter shown in FIG. 6;

FIG. 9 is a side view of a pivot pin, the pivot pin being the one shown in FIGS. 2, 5, 7 and 8;

FIG. 10 is an end view of the pivot pin shown in FIG. 9;

FIG. 11 is a cross-sectional view taken along the lines XI—XI in FIG. 9; and

FIG. 12 is an enlarged view of the circled area labelled XII in FIG. 11.

DETAILED DESCRIPTION OF THE PREFERRED EMBODIMENTS

Figure 1:
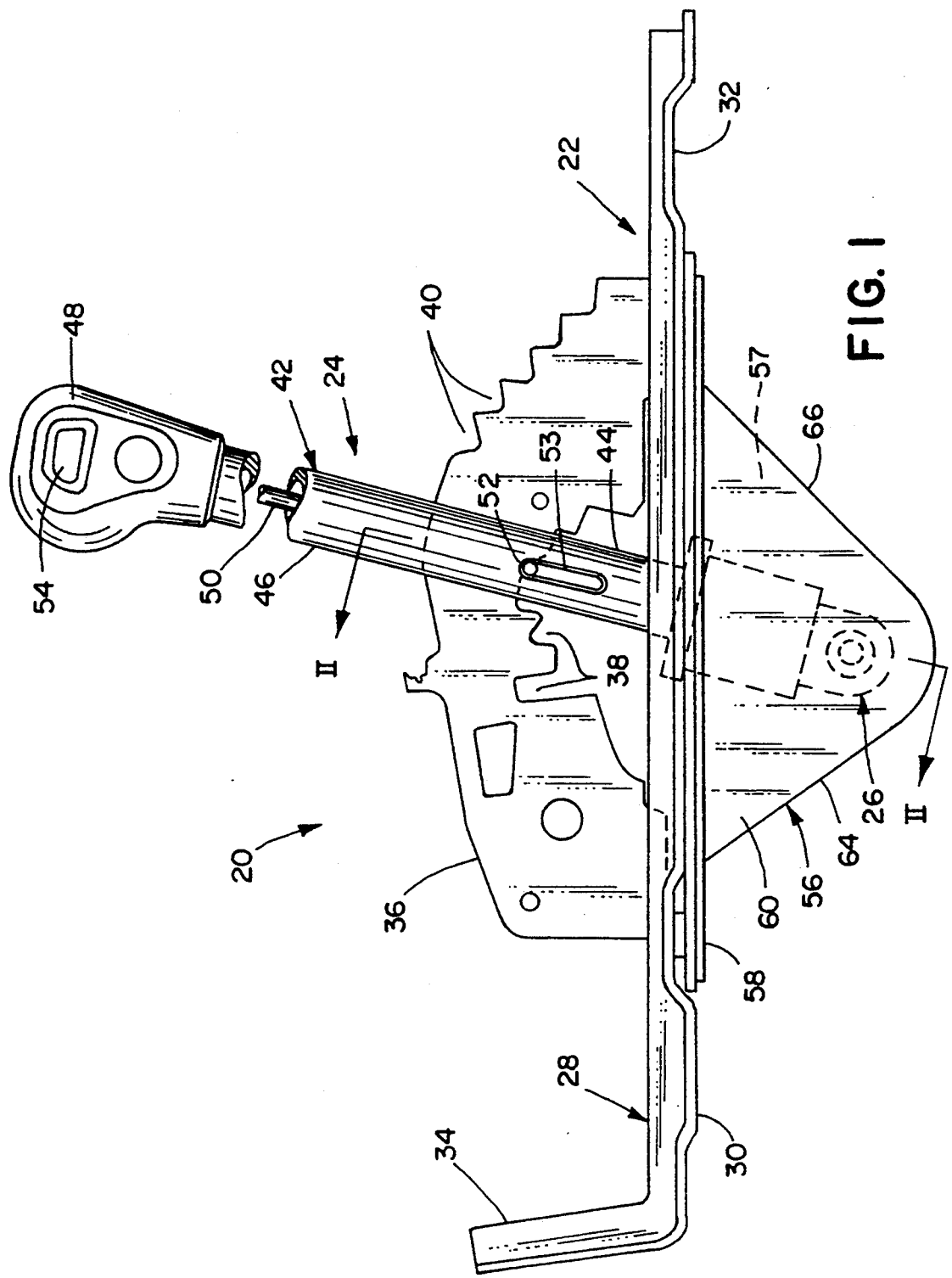
FIG. 1 is a side view of a shifter for an automotive transmission embodying the present invention.

A shifter 20 embodying the present invention (FIG. 1) includes a base 22 and a shift stick 24 pivotally mounted to base 22 on a bearing arrangement 26. Bearing arrangement 26 is particularly suited to facilitate assembly and also minimize the number of pieces and subassembly operations required for the assembly, while providing a consistent assembly as noted below.

Base 22 (FIG. 1) includes an elongated stamped member 28 made of sheet metal or molded plastic. Stamped member 28 includes attachment flanges 30 and 32 located for secure attachment of base 22 to a vehicle floor pan (not specifically shown). Stamped members 28 further includes a mounting flange 34 configured to securely mount the sleeve of a transmission shift cable (not specifically shown). A detent plate 36 is secured to stamped member 28, detent plate 36 including an upright section having notches 38 formed in a lower side of the center section for defining various gear positions, and multiple depressions 40 formed on an upper side of the center section for cooperating with a feel positioner (not shown) as the shift stick 24 is moved between the gear positions.

Shift stick 24 (FIG. 1) includes a tubular member 42 having a lower end 44 and an upper end 46. A handle 48 is attached to upper end 46. A rod 50 extends longitudinally within tubular member 42 and is spring biased upwardly by a spring 49 (FIG. 2) located at the bottom of rod 50. A pawl 52 (FIG. 1) on the lower end of rod 50 extends sideways through a slot 53 in tubular member 42 and operably engages notches 38 in detent plate 36 to define various gear positions. A push button 54 is positioned in handle 48 and operably connected to the top of rod 50 for moving rod 50 downwardly against the bias of spring 49 to disengage pawl 52. A mounting bracket 55 is secured to shift stick 24 for carrying a feel positioner (not shown) to engage depressions 40 on detent plate 36.

A recess forming plate 56 is attached to the bottom of stamped member 28 to protect the lower end 44 of shift stick 24. Recess forming plate 56 includes flanges 58 configured for attachment to stamped member 28, such as by welding or the like. Recess forming plate 56 further includes sidewalls 60 (and 62), front wall 64, and rear wall 66 that form a triangularly-shaped enclosed recess 57 about bearing arrangement 26 and specifically the lower end 44 of shift stick 24.

Stamped member 28 (FIG. 2) further includes a pair of downwardly extending inner flanges 68 and 70 that extend into recess 57 formed by recess forming plate 56. A pair of downwardly extending bearing forming flanges 72 and 74 are welded or otherwise secured to inner flanges 68 and 70, respectively. Bearing forming flanges 72 and 74 include aligned holes 76 and 78, respectively, which holes define an axis of rotation "A" for shift stick 24. Bearing forming flanges 72 and 74 are connected by a cross wall 80 that secures flanges 72 and 74 in their parallel and spaced apart condition.

A molded structure 100 is secured to the lower end 44 of shift stick 24 (FIGS. 2 and 3). Structure 100 includes a saddle bracket 102 having an upper section 104 and a lower section 106. Upper section 104 includes a cylindrically shaped wall 108 having a bore 110 for receiving the lower end 44 of tubular member 42, and further includes a wall 112 closing the lower end of bore 110 so that tubular member 42 cannot be extended downwardly through upper portion 104. Wall 112 engages the bottom of tubular member 42 and further supports the coil spring 49, coil spring 49 extending upwardly into tubular member 42 into engagement with pawl 52 and rod 50 for biasing rod 50 and pawl 52 upwardly. A pair of reinforcement webs 116 and 118 rigidly support cylindrical wall 108 on lower section 106 in a perpendicular arrangement. Saddle bracket 102 is molded of a polymeric material such as polyester or glass-filled nylon.

Lower section 106 is generally cylindrically-shaped and includes opposing lobes 120 and 122 defining an open space 124 therebetween. Each lobe 120 and 122 includes a hole 126 and 128, respectively. Holes 126 and 128 are aligned and extend co-axially along the axis of rotation A. One or more fingers 132 and 134 are located at the ends of and extend generally upwardly and slightly outwardly from lobes 120 and 122. Fingers 132 and 134 are configured to engage, bearing forming flanges 72 and 74 to center structure 100 between flanges 72 and 74, as described below.

Bearing arrangement 26 (FIG. 2) further includes a pair of pivot pins 138 and 140 that are identical in construction, and therefore only pivot pin 138 will be described hereinafter. Pivot pin 138 (FIG. 9) includes a shaft 142, a head or enlarged end 144 and a snap-lock configured end 146 opposite head 144. Shaft 142 is configured for press-fit engagement into holes 126 in lobe 120 of saddle bracket 102 (see FIG. 3) such that shaft 142 is non-rotatable within hole 126 once inserted. Further, shaft 142 includes a non-uniform surface 148 (FIGS. 9–12) and in particular includes multiple sharply tipped ribs or "crush beads" 150 extending longitudinally on shaft 142. Ribs 150 penetrate and press-fit against the material defining holes 126 to prevent the rotation of pivot pin 138 in saddle bracket 102.

Head 144 of pivot pin 138 is enlarged to a diameter greater than shaft 142, and further includes a peripheral surface 152 adapted to form a low friction bearing surface with hole 76 in bearing forming flange 72 (FIGS. 9–12). Notably, pivot pin 138 can be made of any lubricous material, but it is contemplated that it will be made of an acetal material (e.g. Delrin polymeric material) or other durable polymeric material. Snap-lock end 146 includes a pair of slots 154 that extend axially into shaft 142 from end 146 to form fingers 156. Fingers 156 are resilient such that they can be temporarily flexed inwardly during assembly into hole 126 of saddle bracket lobe 120 (FIG. 3). Fingers 156 can vary in number from one to several even though only four are shown here. The ends of fingers 156 include an outwardly extending protrusion 158 (FIG. 9) that defines an inclined lead-in surface 160 to facilitate insertion into hole 126, and a retention lip 162 for lockingly engaging lobe 120 once installed.

To assemble shifter 20, saddle bracket 102 is positioned between bearing-forming flanges 72 (FIG. 2), and the holes 126 and 128 are aligned with holes 76. Pivot pins 138 and 140 can then be extended through respective bearing forming flanges 72 and 74 into lobes 120 and 122. As pivot pin 138 is extended into hole 126 of lobe 120, lead-in surface 160 causes fingers 156 to compress so that shaft 142 of pivot pin 138 can be extended therethrough. The length of shaft 142 is of such dimension so that lip 162 snap-locks onto lobe 120 against the surface on lobe 120 defining space 124. When installed, pivot pin 138 is frictionally held within hole 126 by several means including: by press-fit engagement, by ribs 50 frictionally deforming material in holes 126, and by lips 162 and head 144 abutting either side of lobe 120. Pivot pin 140 is similarly positioned in lobe 122. Preferably, the thickness of the material in bearing forming flanges 72 and 74 defining holes 76 and 78 is about equal to the length of head 144 so that the bearing surfaces of holes 76 and 78 of pivot pin heads 144 are sufficiently large to fully engage head surface 152 and thus adequately support pivot shift stick 24 for long service life. Fingers 132 and 134 of structure 100 engage the side of bearing forming flanges 72 and 74 causing saddle bracket 120 to be centered between flanges 72 and 74. To further protect the bearing arrangement 26, recess forming plate 56 is then attached to stamped member 28 protectingly around bearing arrangement 26 by attachment of flanges 58 to stamped member 28.

In a second embodiment of the invention, a shifter 180 (FIGS. 4 and 5) includes a base 182 and the shift stick 24 (previously described) pivotally mounted on base 182 defining a bearing arrangement 186 therewith. Base 182 includes a stamped member 188 and a detent plate 190 configured for attachment to a vehicle and further configured to define various gear positions such as were previously defined. Stamped member 188 includes upright opposing ear-shaped flanges 192 and 194 that define a space therebetween. Ear-shaped flanges 192 and 194 are mirror images but otherwise identical, and hence only flange 192 will be described hereinafter. Flange 192 includes a center section 196 having a hole 198 therein. Hole 198 is extruded in an outward direction away from ear-shaped flange 194 (FIG. 5) to provide an increased bearing surface 200. Saddle bracket 102 of shift stick 24 is positioned between ear-shaped flanges 192 and 194 with holes 126 and 128 in saddle bracket 102 aligned with holes 198 in ear-shaped flanges 192 and 194. Pivot pins 138 and 140 are extended through flange holes 198 and saddle bracket holes 126 and 128 into secure engagement with saddle bracket lobes 120 and 122. The heads 144 of pivot pins 138 and 140 that protrude from saddle bracket 202 form a bearing surface which slideably pivotally engages holes 198 in ear-shaped flanges 192 and 194.

In a third embodiment of the shifter (FIGS. 6 and 7), a shifter 240 includes a base 242 and a shift stick 24' forming a bearing arrangement 246. Base 242 includes a stamped member 248 that is substantially identical to stamped member 28 with the exception that stamped member 248 includes downwardly extending flanges 250 and 252. Bearing forming flanges 251 and 253 are attached to flanges 250 and 252 such as by welding, and include outwardly extruded material 254 and 256 defining holes 255 and 257. The material 254 and 256 is extruded outwardly to increase the bearing surface on flanges 250 and 252, which surface is sufficiently large to mateably engage heads 144 on pivot pins 138 and 140 to provide a long service life and to prevent excessive wear. The material defining extruded holes 254 and 256 is further upset to form inner flanges 266 and 268.

Shift stick 24' (FIG. 7) is identical to shift stick 24 except that shift stick 24' includes a modified saddle bracket 102'. Saddle bracket 102' is identical to saddle bracket 102 previously described, with the exception that lobes 120' and 122' are foreshortened in the direction of holes 126' and 128'. This allows pivot pin 138 (and 140) to be extended through hole 126' (and 128') and snap-lock into lobe 120' (and 122') with pivot pin head 144 spaced away from lobe 120' (and 122'). The space between pin head 144 and lobe 120' (and 122') is sufficient to receive inner flange 266 (and 268). Inner flange 266 (and 268) defines a hole having a diameter substantially equal to holes 126' (and 128') in lobes 120' (and 122'). Thus, pivot pin 138 captures inner flange 266 between pivot pin head 144 and lobe 120' to provide a more stable assembly. In the embodiment shown, head 144 of pivot pin 140 also captures inner flange 268 between head 144 and lobe 122' to provide an even more stable assembly, although it is contemplated that a shifter could be constructed with only one side adapted in this manner.

Thus, a shifter is provided for a vehicle transmission that includes a base having a pair of parallel flanges, and a shift stick having a structure adapted to fit between the flanges. The flanges and the structure include apertures that can be co-axially aligned such that pivot pins can be extended through the flanges into the structure to thus form a low friction bearing. Specifically, the pivot pins include a shaft section with an end adapted to snap-lock into the structure and further include a non-uniform surface with ribs that non-rotatably frictionally engage the structure when extended into the apertures in the structure. The pivot pins further include a head adapted to rotatably engage the apertures in the flanges, the head and the flange apertures forming a low friction bearing arrangement for supporting the shift stick on the shifter base. The pivot pins are preferably made from a lubricous polymeric material such as acetal.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A shifter for an automotive transmission comprising:
   an elongated pivotable shift stick having an upper end and a lower end;
   a base adapted for mounting to a vehicle;
   a structure attached to said lower end of said shift stick;
   a pair of bearing forming supports located on said base and spaced apart for receiving said structure therebetween; and
   shaft means including at least one pivot pin having a self-locking shaft section engaging said structure, said shaft means protruding laterally from said structure for pivotally slideably engaging said pair of bearing forming supports to define an axis of rotation about which said shift stick pivots, said shaft means and said pair of bearing forming supports including bearing surfaces configured to slideably engage and form a low friction bearing arrangement.

2. A shifter as defined in claim 1 wherein said structure includes a saddle bracket having an aperture aligned with the axis of rotation, said shaft means non-rotatably engaging said aperture.

3. The shifter as defined in claim 2 wherein said at least one pivot pin is non-rotatably engaged with said aperture, said at least one pivot pin including a head having said bearing surface thereon and a shaft section, said bearing surface being cylindrically-shaped to rotatably engage said pair of bearing forming supports.

4. A shifter as defined in claim 3 wherein said pivot pin includes means for snap-locking into said aperture of said saddle bracket.

5. The shifter as defined in claim 3 wherein said head of said pivot pins is enlarged to a diameter larger than said shaft section, said head forming a bearing surface for engaging said bearing surface on said bearing forming support.

6. The shifter as defined in claim 5 wherein said shaft section of said pivot pin includes an irregular outer surface for press-fittingly and non-rotatably engaging said structure.

7. The shifter as defined in claim 6 wherein said shaft means includes two of said pivot pins.

8. The shifter as defined in claim 1 wherein said bearing pair of bearing forming supports each include an aperture aligned co-axially with said axis of rotation, wherein said structure includes a saddle bracket having at least one hole aligned co-axially with said axis of rotation, and wherein said shaft means includes a pair of said pivot pins that extend through said apertures in said pair of bearing forming supports into said at least one hole in said structure.

9. The shifter as defined in claim 8 wherein said pivot pins are configured to snap-lock into said at least one hole to facilitate assembly.

10. The shifter as defined in claim 8 wherein said pivot pins include a shaft having a non-uniform outer surface.

11. The shifter as defined in claim 8 wherein said pivot pin includes a head including a bearing surface that forms said bearing arrangement with said apertures of said pair of bearing forming supports.

12. The shifter as defined in claim 11 wherein said pair of bearing forming supports define a flange around at least one of said apertures, said flange being slideably captured between said head and said saddle bracket.

13. The shifter as defined in claim 8 wherein said pair of bearing forming supports include parallel flanges having said co-axial apertures therein.

14. The shifter as defined in claim 1 wherein said pivot pin comprises a lubricous polymeric material.

15. The bearing arrangement for a shifter for an automatic transmission, the shifter including a base and a shift stick pivotally mounted to the base at a lower end of the shift stick, comprising:

support means on said base for pivotally supporting said shift stick including a pair of flanges spaced apart, said pair of flanges including a first material defining a first pair of aligned holes;

a structure secured to the lower end of said shift stick and including a second material defining a second pair of aligned holes; and lubricous polymeric pivot means extending through said first and second pairs of aligned holes for pivotally mounting said shift stick to said support means, said lubricous polymeric pivot means being non-rotatably secured in said second material but being rotatable in said first material; whereby said lubricous polymeric pivot means and said first material form bearing surfaces that slideably engage to form a pivotable bearing for the shift stick.

16. The bearing arrangement as defined in claim 15 wherein said pivot means includes a pivot pin.

17. The bearing arrangement as defined in claim 16 including a pair of said pivot pins.

18. The bearing arrangement as defined in claim 16 wherein said pivot pin includes a shaft non-rotatably secured in said second material and further includes a head, said head including a peripheral surface forming one of said bearing surfaces.

19. The bearing arrangement as defined in claim 18 wherein said pivot pin includes an end opposite said head including protrusions configured to snap-lock into one of said holes in said structure.

20. The bearing arrangement as defined in claim 19 wherein said structure is captured between said pair of flanges and thus is substantially prevented from side-to-side movement along said axis of rotation.

21. The bearing arrangement as defined in claim 15 wherein said pivot means includes a shaft having a non-uniform surface that is press-fit into said first pair of aligned holes and thus non-rotatably secured in said structure.

22. A shifter for an automotive transmission comprising:

an elongated pivotable shift stick having an upper end and a lower end;

a base adapted for mounting to a vehicle;

a bracket attached to said lower end having an enlarged section of predetermined width that includes a first pair of aligned holes;

support means on said base defining a space therebetween not less than said predetermined width for pivotally supporting said bracket, said support means including material defining a second pair of spaced apart and aligned holes;

a pair of pivot pins each including a shaft extended into said first pair of aligned holes and frictionally non-rotatingly interlockingly engaging said enlarged section, said pair of pivot pins each further including an enlarged headed end protruding from said section and slideably rotatingly engaging said material defining said second pair of aligned holes in said support means.

23. The shifter as defined in claim 22 wherein said pair of pivot pins each include a second end opposite said enlarged heated end, said second end being configured to snap-lock into said section of said bracket.

24. The shifter as defined in claim 22 wherein said pair of pivot pins are made of a lubricous material, and thus said enlarged head end of said pivot pins and said material defining said second pair of aligned holes define a low friction bearing which does not need to be otherwise lubricated.

25. The shifter as defined in claim 22 wherein said shaft has a non-uniform surface for securely frictionally engaging said first pair of aligned holes to prevent rotation of said shaft in said bracket.

* * * * *

UNITED STATES PATENT AND TRADEMARK OFFICE
CERTIFICATE OF CORRECTION

PATENT NO. : 5,442,975
DATED : August 22, 1995
INVENTOR(S) : Charles Osborn

It is certified that error appears in the above-indentified patent and that said Letters Patent is hereby corrected as shown below:

Column 3, line 65;
    "Delrin" should be --DELRIN--.

Column 8, line 21, claim 22;
    After "said" (first occurrence) insert --enlarged--.

Column 8, line 26, claim 23;
    "heated" should be --headed--.

Column 8, line 30, claim 24;
    "head" should be --headed--.

Signed and Sealed this

Twenty-third Day of January, 1996

*Attest:*

BRUCE LEHMAN

*Attesting Officer*     *Commissioner of Patents and Trademarks*